(12) United States Patent
Kim et al.

(10) Patent No.: US 11,377,778 B2
(45) Date of Patent: Jul. 5, 2022

(54) WASHING MACHINE

(71) Applicant: LG Electronics Inc., Seoul (KR)

(72) Inventors: Dongcheol Kim, Seoul (KR);
Youngjong Kim, Seoul (KR)

(73) Assignee: LG Electronics Inc., Seoul (KR)

(*) Notice: Subject to any disclaimer, the term of this patent is extended or adjusted under 35 U.S.C. 154(b) by 528 days.

(21) Appl. No.: 16/516,555

(22) Filed: Jul. 19, 2019

(65) Prior Publication Data
US 2020/0024793 A1    Jan. 23, 2020

(30) Foreign Application Priority Data

Jul. 19, 2018   (KR) .................. 10-2018-0083786

(51) Int. Cl.
*D06F 39/08* (2006.01)
*F04D 13/02* (2006.01)
*F04D 13/08* (2006.01)
*F04D 15/00* (2006.01)
*D06F 103/48* (2020.01)

(52) U.S. Cl.
CPC ......... *D06F 39/085* (2013.01); *F04D 13/028* (2013.01); *F04D 13/086* (2013.01); *F04D 15/0022* (2013.01); *D06F 2103/48* (2020.02)

(58) Field of Classification Search
CPC .. D06F 39/085; D06F 2103/48; F04D 13/028; F04D 13/086; F04D 15/0022
See application file for complete search history.

(56) References Cited

U.S. PATENT DOCUMENTS

| 2017/0247828 A1 | 8/2017 | Tsuji |
| 2018/0050577 A1* | 2/2018 | Jensen ............. B60H 1/2203 |
| 2018/0073186 A1 | 3/2018 | Choi et al. |

(Continued)

FOREIGN PATENT DOCUMENTS

| DE | 102007007670 | 8/2008 |
| EP | 2055958 | 5/2009 |
| KR | 10-2012-0117152 | 10/2012 |

(Continued)

OTHER PUBLICATIONS

European Search Report dated Nov. 18, 2019 based on European Patent Application 19187287.8.

(Continued)

*Primary Examiner* — Joseph L. Perrin
(74) *Attorney, Agent, or Firm* — Birch, Stewart, Kolasch & Birch, LLP

(57) ABSTRACT

A pump includes: a pump housing having an inflow port, a first discharge port, and a second discharge port; a pump motor for providing a rotational force; and an impeller disposed in the pump housing and configured to pump water introduced through the inflow port. A planetary gear train includes a carrier connected to a rotary shaft of the pump motor, a sun gear connected to the impeller, a pinion gear rotatably installed in the carrier and engaged with the sun gear, and a ring gear engaged with the pinion gear. A rotatable valve disc is couple with the ring gear in the pump housing, and configured to close the first discharge port and open the second discharge port in a first rotation position, and open the first discharge port and close the second discharge port in a second rotation position.

18 Claims, 8 Drawing Sheets

(56) References Cited

U.S. PATENT DOCUMENTS

2018/0313015 A1* 11/2018 Kim .................. D06F 37/40
2020/0291930 A1* 9/2020 Marshall ............ F04B 43/02

FOREIGN PATENT DOCUMENTS

| KR | 10-2016-0088205 | 7/2016 |
| KR | 10-1735432 | 5/2017 |
| WO | WO 2016/087986 | 6/2016 |

OTHER PUBLICATIONS

PCT International Search Report dated Nov. 20, 2019 based on PCT/KR2019/008952.

* cited by examiner

WASHING MACHINE

CROSS-REFERENCE TO RELATED APPLICATIONS

This application claims the benefit of priority to Korean Application No. 10-2018-0083786, filed Jul. 19, 2018, the entire contents of which are incorporated herein by reference.

BACKGROUND

Field

The present disclosure relates to a washing machine provided with a pump for circulation and drain.

Description of the Related Art

A washing machine is an apparatus for loading laundry into a drum installed in a tub containing water and rotating the drum to treat the laundry.

Korean Patent Laid-Open Publication No. 10-2013-0109354 (hereinafter, referred to as '354' patent) discloses a flow path switching pump for a washing machine which achieves both drain and circulation. The flow path switching pump has a drain flow path part and a circulation flow path part in a tangential direction from a cylindrical water flow forming part that accommodates an impeller, and water is selectively discharged to the drain flow path part or the circulation flow path part according to the rotation direction of the impeller. The '354 patent forms water flow resistance ribs on the downstream side of the drain flow path part and the circulation flow path part so as not to be discharged to the other when water is discharged through any one of the drain flow path part and the circulation flow path part. However, if the rotation speed of the impeller is increased, there is a problem that a flow rate leaked through an undesired flow path part is generated despite the presence of the water flow resistance rib.

Korean Patent No. 10-1655412 (hereinafter, referred to as '412 patent) discloses a bidirectional pump for drain and circulation which has a first discharge port and a second discharge port for discharging a water flow pumped by an impeller. The '412 patent discloses an opening/closing means for selectively opening/closing the first discharge port and the second discharge port. The opening/closing means is operated by the water flow pressure generated by the impeller, and is configured to selectively open/close the first discharge port or the second discharge port according to the rotation direction of the impeller. As described above, the manner in which the opening/closing means has a problem that the reliability that the operation of the opening/closing means is always performed accurately can not be guaranteed due to various factors such as fluctuation of the flow rate supplied into the pump, water flow resistance, change of the rotation speed of the impeller, and constraint due to lint floating in water flow.

SUMMARY

The present disclosure has been made in view of the above problems, and provides a pump in which opening and closing operations of a first discharge port and a second discharge port are actively performed by a valve disk interlocked with a pump motor, and a washing machine including the same.

In one exemplary aspect of the present disclosure a pump is configured to accurately control the opening and closing of the first discharge port and the second discharge port even if foreign matter such as lint is floating in the water flow, and a washing machine includes the same.

In another aspect of the present disclosure a pump is coupled with planetary gear train to increase the speed of the impeller, while a ring gear of the planetary gear train is installed to be rotatable within a certain angle, and serves to control the opening and closing of the first discharge port and the second discharge port by interlocking the valve disc with the ring gear, and a washing machine including the same.

In yet another aspect of the present disclosure a pump prevents unnecessary noise from being generated when the valve disc switches a flow path, and a washing machine includes the same.

In another aspect of the present disclosure a pump reduces an applied impact in a process of switching a flow path by the valve disc, and a washing machine includes the same.

In a still further aspect of the present disclosure, the pump selectively discharges the water flow formed by the impeller through a first discharge port or a second discharge port. The first discharge port and the second discharge port are opened and closed by a valve disc, the second discharge port is opened when the first discharge port is closed by the valve disc, and the first discharge port is opened when the second discharge port is closed by the valve disc.

A planetary gear train for accelerating the rotation of the pump motor and transmitting the accelerated rotation to the impeller is provided. The planetary gear train includes a sun gear, a carrier, a pinion gear, and a ring gear. The rotary shaft of the pump motor is connected to the carrier, and the impeller is connected to the rotary shaft of the sun gear. The ring gear is rotated in a direction opposite to the sun gear as long as rotation is not constrained by an external force.

The valve disc is rotated together with the ring gear. The valve disc opens/closes the first discharge port or the second discharge port according to the rotation position. That is, by the rotation of the pump motor, the ring gear is rotated together with the valve disc. The valve disc closes the first discharge port and opens the second discharge port in the first rotation position. The water pumped by the impeller is discharged to the first discharge port, but is prevented from being discharged to the second discharge port.

The valve disc opens the first discharge port and closes the second discharge port in the second rotation position. The water pumped by the impeller is discharged to the second discharge port, but is prevented from being discharged to the first discharge port.

A first stopper for restraining the rotation of the normal rotation direction of the valve disc when the valve disc is rotated in the normal rotation direction to reach the first rotation position may be provided. Since the rotation (normal rotation direction) of the valve disc is restrained by the first stopper in a state of reaching the first rotation position, the state where the first discharge port is opened and the second discharge port is closed can be maintained.

A second stopper for restraining the rotation of the reverse rotation direction of the valve disc when the valve disc is rotated in the reverse rotation direction to reach the second rotation position from the first rotation position may be provided. Throughout this specification and claims, a "normal rotation direction" is understood to be a rotation direction that is opposite to a "reverse rotation direction". Since the rotation (reverse rotation direction) of the valve disc is restrained by the second stopper in a state of reaching the second rotation position, the state where the second discharge port is opened and the first discharge port is closed can be maintained.

The valve disc may include a rotating body connected to the ring gear, and a first and/or second plug provided in the rotating body. The first plug closes the first discharge port when the rotating body is in the first rotation position, and opens the first discharge port when the rotating body is rotated in the reverse rotation direction from the first rotation position. The first plug may protrude from the outer circumference of the rotating body.

The second plug may close the second discharge port when the rotating body is in the second rotation position, and may open the second discharge port when the rotating body rotates in the normal rotation direction from the second rotation position. The second plug may protrude from the outer circumference of the rotating body.

The first stopper may protrude from an inner circumferential surface of the pump housing that defines a space in which the impeller is accommodated. The first stopper may restrain the rotation of the normal rotation direction of the valve disk by interference with the first plug.

The first stopper may be a protrusion that interferes with the tip of the first plug when the first plug is rotating in the normal rotation direction (also referred to herein as "the normal rotation direction tip of the first plug," or "the tip of the normal rotation direction"). The first plug includes: a first plug body portion extending in the reverse rotation direction from the tip of the plug when the plug is rotating in the normal rotation direction (the tip of the normal rotation direction) and blocking the first discharge port; and a first sealing protrusion protruding outward along a radial direction from the first plug body portion.

The inner circumferential surface of the pump housing includes: a circling permitting area formed in an outer side of the sealing protrusion in the radial direction in a section where the sealing protrusion circles due to the rotation of the valve disc; and a first sealing area that is bent toward the rotating body from the circling permitting area, and is in close contact with the first sealing protrusion while being positioned in the normal rotation direction than the first sealing protrusion in a state in which the valve disc reaches the first rotation position.

The second stopper is protruded from an inner circumferential surface of the pump housing defining a space in which the impeller is accommodated, and restrains rotation of the valve disc in the reverse rotation direction by interference with the second plug. The second stopper interferes with a tip of the second plug when the second plug is rotating in the reverse rotation direction (the tip of the reverse rotation direction of the second plug). The second plug includes: a second plug body portion extending in the normal rotation direction from the tip of the second plug when the second plug is rotating in the reverse rotation direction (the tip of the reverse rotation direction of the second plug) and blocking the second discharge port; and a second sealing protrusion protruding outward along a radial direction from the second plug body portion. The inner circumferential surface of the pump housing includes: a circling permitting area formed in an outer side of the sealing protrusion in the radial direction in a section where the sealing protrusion circles due to the rotation of the valve disc; and a second sealing area that is bent toward the rotating body from the circling permitting area, and is in close contact with the second sealing protrusion while being positioned in the reverse rotation direction than the second sealing protrusion in a state in which the valve disc reaches the second rotation position.

A buffer member interposed between the first sealing protrusion and the first sealing area may be further provided. A buffer member interposed between the second sealing protrusion and the second sealing area may be further provided.

A buffer member interposed between the first plug and the first stopper may be further provided. A buffer member interposed between the second plug and the second stopper may be further provided.

The pump motor is started at a first acceleration slope and is switched to a second acceleration slope greater than the first acceleration slope. The switching from the first acceleration slope to the second acceleration slope is performed based on a current value flowing in the pump motor.

In accordance with another aspect of the present disclosure, a washing machine includes: a water storage tank containing water and a washing tub rotatably installed in the water storage tank. The pump selectively pumps the water discharged from the water storage tank to a drain pipe or a circulation pipe.

The water discharged from the water storage tank is introduced through the inflow port of the pump. The first discharge port of the pump discharges water to the drain pipe. The second discharge port discharges water to the circulation pipe.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
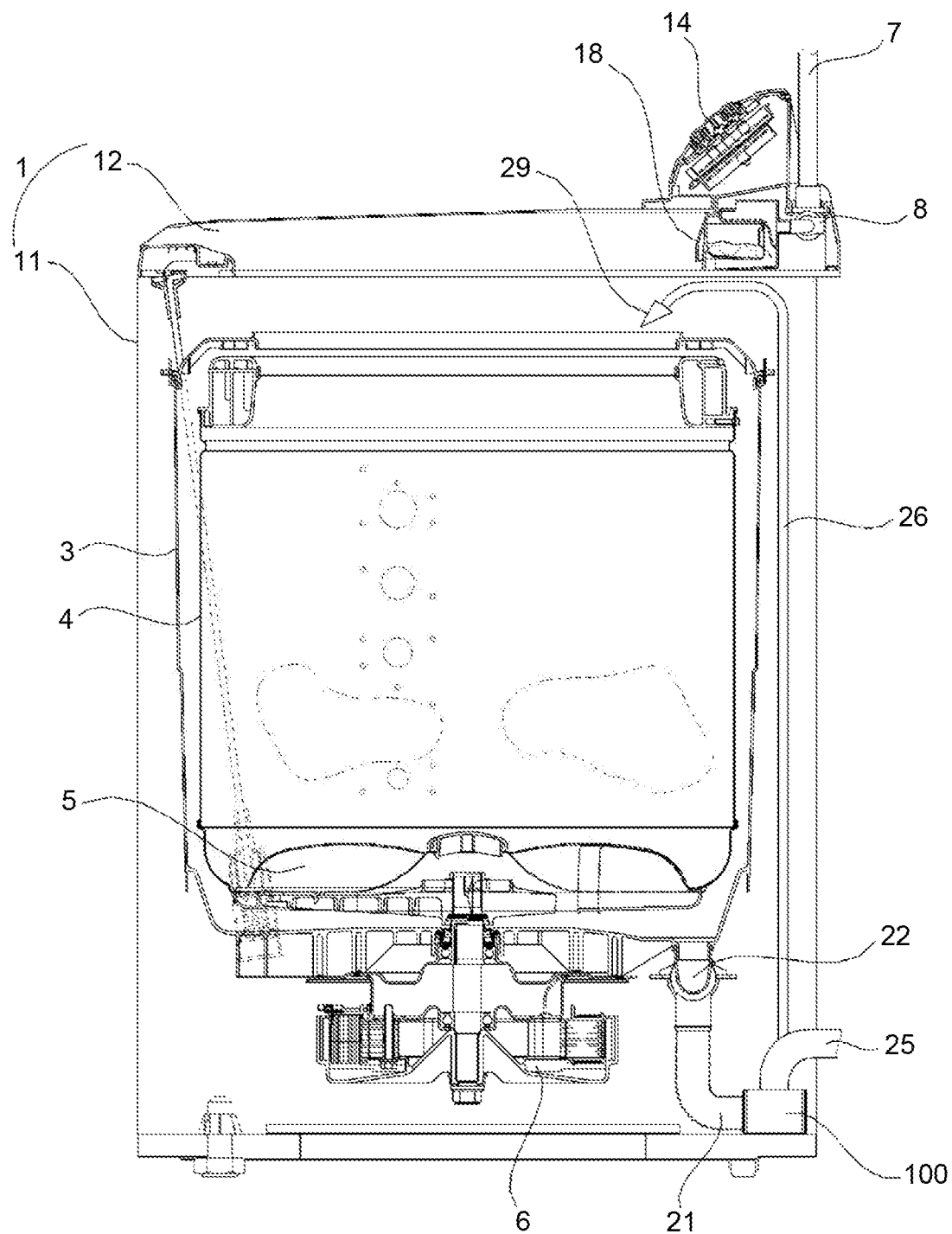
FIG. 1 is a sectional view of a washing machine according to an embodiment of the present disclosure.
Figure 2A:
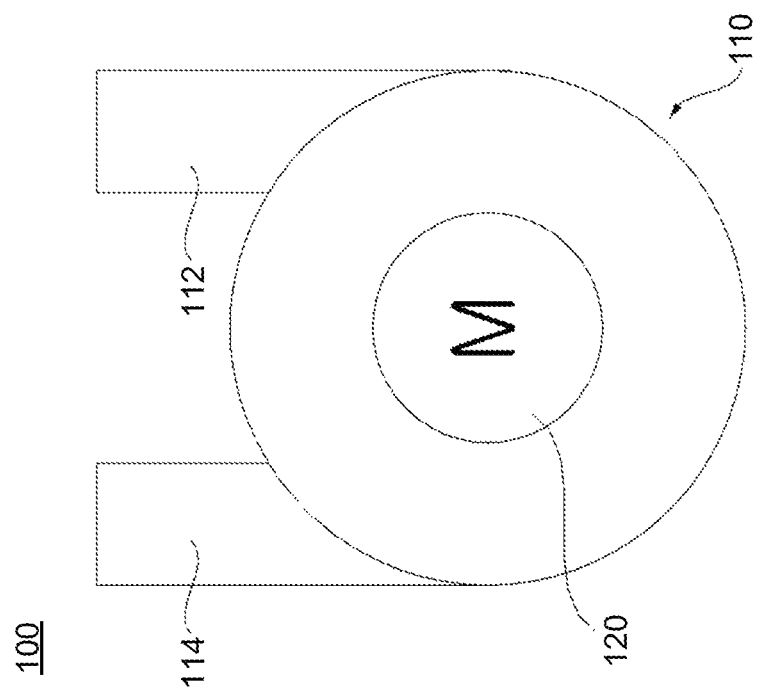
FIG. 2A is a front view of the pump shown in FIG. 1.
Figure 2B:
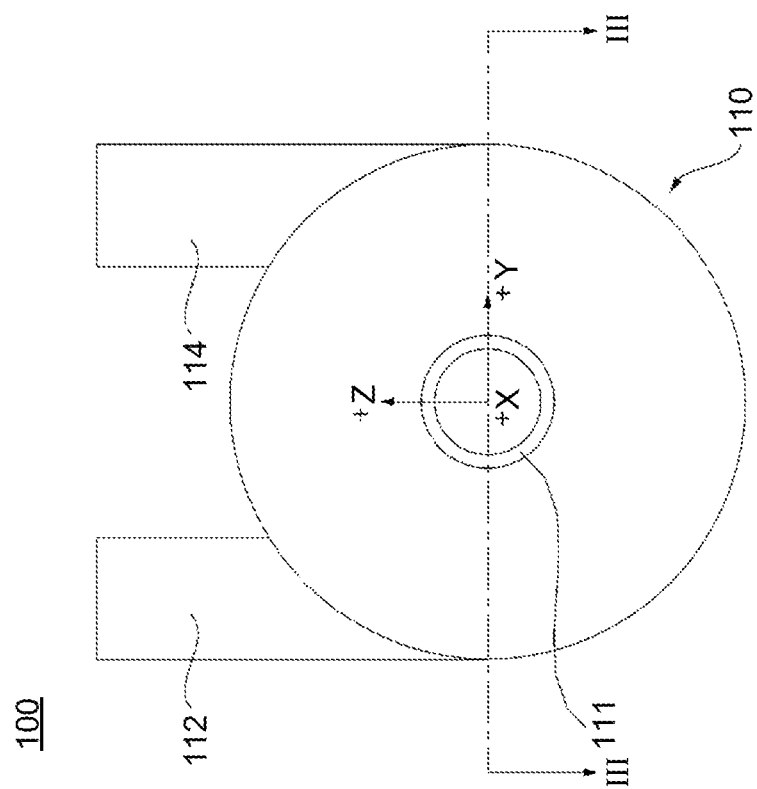
FIG. 2B is a rear view of the pump shown in FIG. 1.

FIG. 1 is a sectional view of a washing machine according to an embodiment of the present disclosure. FIG. 2A is a front view of the pump shown in FIG. 1, and FIG. 2B is a rear view of the pump shown in FIG. 1.

Referring to FIG. 1, the washing machine according to an embodiment of the present disclosure may include a casing 1 forming an outer shape and forming a space in which a water storage tank 3 is accommodated therein.

The casing 1 may include a cabinet 11 having an opened upper surface and a top cover 12 coupled to an opened upper surface of the cabinet 1 and having a loading port for loading laundry formed in a substantially central portion thereof. A door (not shown) for opening and closing the loading port may be rotatably coupled to the top cover 12.

A control panel 14 may be provided on the top cover 12. The control panel 14 is provided with an input part (e.g., a button, a dial, a touch pad, etc.) for receiving an input of various control commands for controlling the operation of the washing machine from a user, and a display part (e.g., LCD, LED display, etc.) for visually displaying the operating state of the washing machine.

A water supply pipe 7 for guiding water supplied from an external water source such as a faucet and a water supply valve 8 for interrupting the water supply pipe 7 may be provided.

A drawer 18 may be stored in a drawer housing 19 to be detachable. The water supplied through the water supply valve 8 is mixed with the detergent via the drawer 18 and then discharged to the water storage tank 3 or a washing tub 4.

A discharge pipe 21 for discharging water from the water storage tank 3 and a drain valve 22 for interrupting the discharge pipe 21 may be provided.

In the water storage tank 3, the washing tub 4 accommodating laundry and rotated around a vertical axis may be disposed. A pulsator 5 may be rotatably provided in the washing tub 4. A washing motor 6 for rotating the pulsator 5 and the washing tub 4 may be provided.

Figure 3:
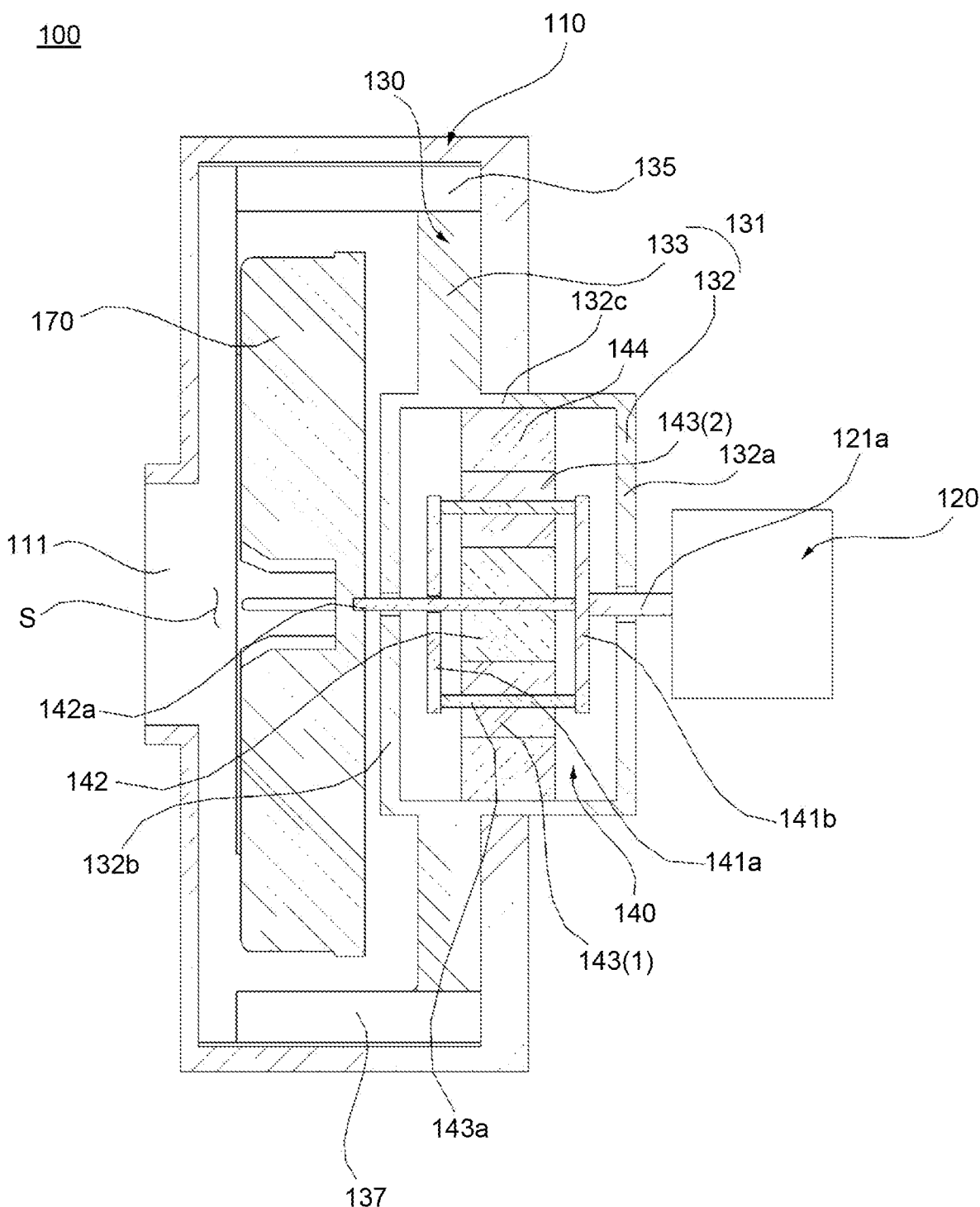
FIG. 3 is a cross-sectional view taken along line III-III in FIG. 2A.

Referring to FIG. 2A and FIG. 2B, the pump 100 includes an inflow port 111 through which water is introduced, and a first discharge port 112 and a second discharge port 114 through which the water introduced through the inflow port 111 is pumped and discharged by the impeller 170 (see FIG. 3). The discharge of water through the first discharge port 112 and the second discharge port 114 must be selectively performed. To this end, a means for closing the second discharge port 114 when the first discharge port 112 is opened, and whereas, closing the first discharge port 112 when the second discharge port 114 is opened is required. This will be described later in more detail.

Meanwhile, the inflow port 111 may be connected to the discharge pipe 21. When the drain valve 22 is opened, water may be supplied to the pump 100 through the discharge pipe 21.

The pump 100 may selectively discharge water to any one of the first discharge port 112 and the second discharge port 114. The first discharge port 112 may be connected to the discharge pipe 25. The water discharged from the first discharge port 112 may be discharged to the outside of the washing machine through the drain pipe 25. In this case, the first discharge port 112 is a port for drain.

The second discharge port 114 may be connected to a circulation pipe 26. The water discharged from the second discharge port 114 is guided to a nozzle 29 through the circulation pipe 26 and then sprayed into the washing tub 4. In this case, the second discharge port 114 is a port for circulating washing water.

Figure 4:
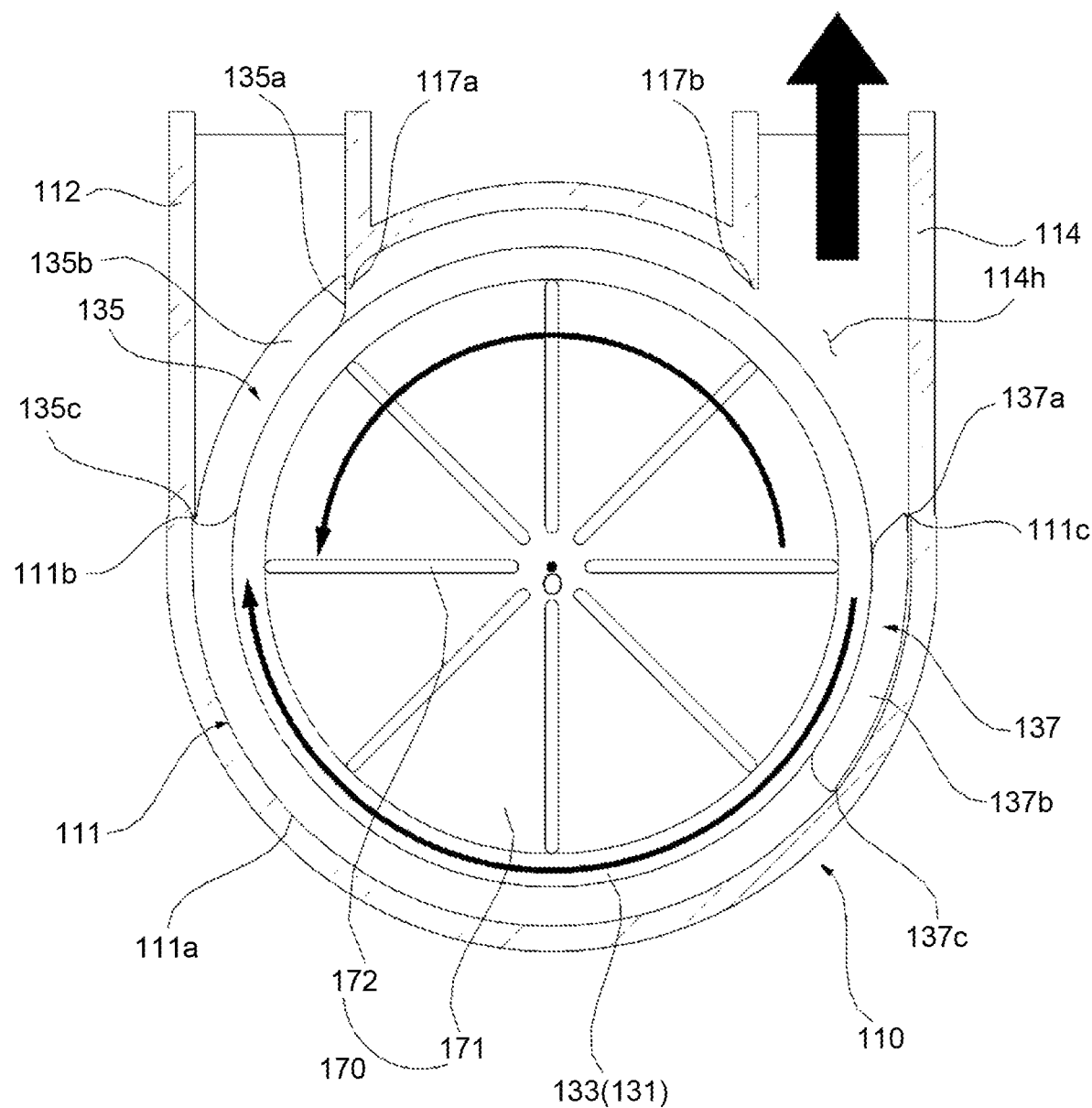
FIG. 4 is a cross-sectional view of the pump of FIG. 2A cut in a YZ plane, and shows a state in which the pump is operated in a circulation mode.
Figure 5:
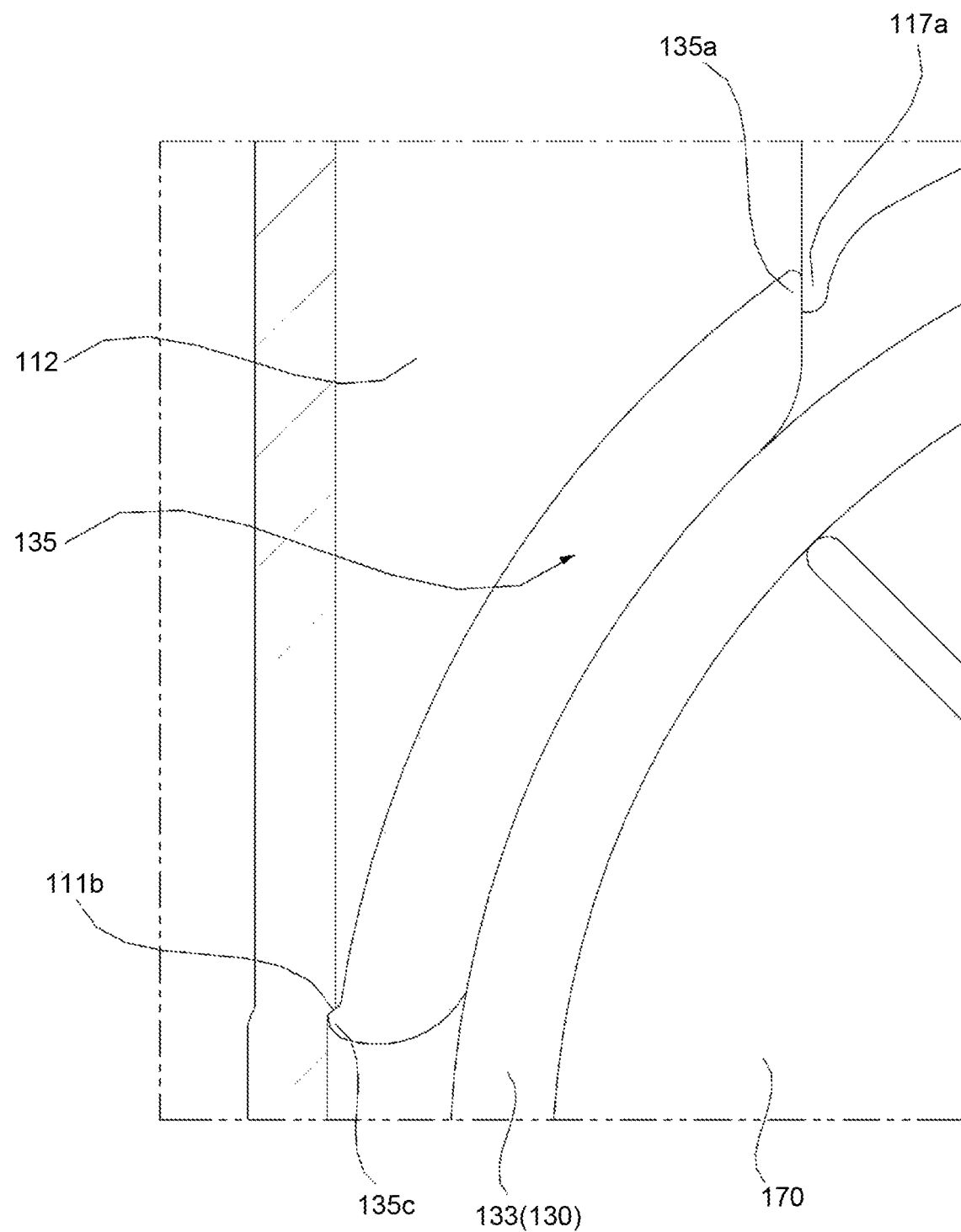
FIG. 5 is an enlarged view of a portion indicated by a dotted line in FIG. 4.
Figure 6:
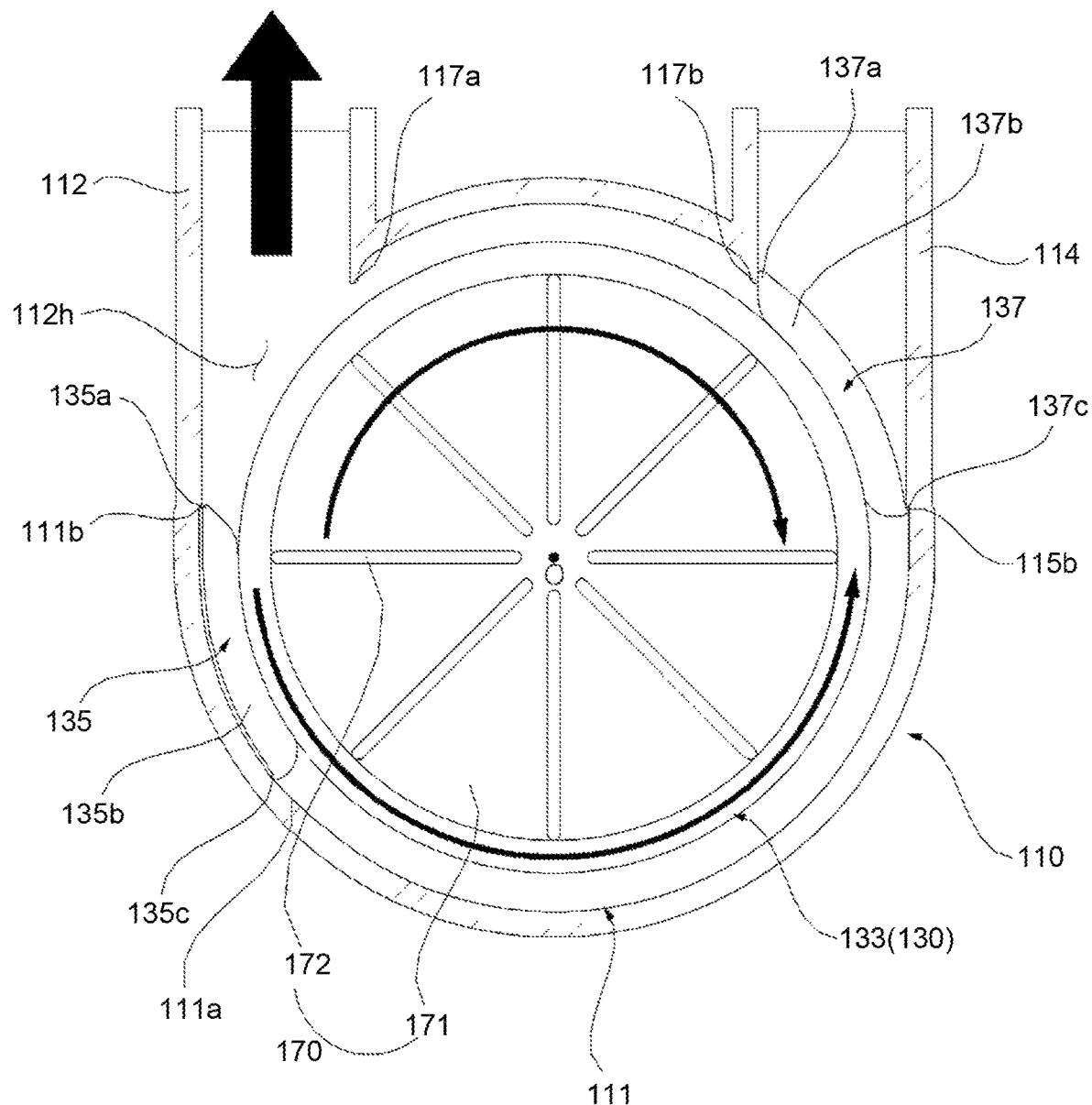
FIG. 6 is a cross-sectional view of the pump of FIG. 2A cut in a YZ plane, and shows a state in which the pump is operated in a drain mode.

FIG. 3 is a cross-sectional view taken along line III-III in FIG. 2A. FIG. 4 is a cross-sectional view of the pump of FIG. 2A cut in a YZ plane, and shows a state in which the pump is operated in a circulation mode. FIG. 5 is an enlarged view of a portion indicated by a dotted line in FIG. 4. FIG. 6 is a cross-sectional view of the pump of FIG. 2A cut in a YZ plane, and shows a state in which the pump is operated in a drain mode. Hereinafter, a pump according to an embodiment of the present disclosure and a washing machine to which the pump is applied will be described with reference to the drawings.

The pump 100 includes a pump housing 110, a pump motor 120, an impeller 170, a valve disc 130 and a planetary gear train 140. The pump housing 110 defines a space S in which the impeller 170 is accommodated, and includes the inflow port 111, the first discharge port 112 and the second discharge port 114 communicating with the space S. The inflow port 111 may extend in the +X direction (or all directions) from the front surface of the pump housing 110, and the first discharge port 112 and the second discharge port 114 may extend approximately in the +Z direction (or upward direction) from the side surface of the pump housing 110.

The rotary shaft of the pump motor 120 may be arranged along the X axis, and in this case, the inner circumferential surface 111 of the pump housing 110 forms a substantially circular shape about the X axis and defines the space S. An inlet 112h of the first discharge port 112 and an inlet 114h of the second discharge port 114 are located in the inner circumferential surface 111. The inlet 112h of the first discharge port 112 and the inlet 114h of the second discharge port 114 are disposed to form a preset angle (preferably, an acute angle, but not necessarily limited thereto) based on the rotation center O of the impeller 170.

In the inner circumferential surface 111 of the pump housing 110, the first discharge port 112 and the second discharge port 114 are disposed to form a certain angle (less than 180 degrees, preferably, an acute angle) with respect to the rotation center O of the impeller 170. The inner surface of the pump housing 110 may form a curved surface wound from a first point where the first discharge port 112 is formed to a second point where the second discharge port 114 is formed while passing through an area forming a reflex angle with respect to the rotation center O. The first discharge port 112 may extend in a tangential direction with respect to the curved surface at the first point, and the second discharge port 114 may extend in a tangential direction with respect to the curved surface at the second point.

The pump motor 120 may be a bidirectional motor that may be rotated in the normal rotation direction or the reverse rotation direction. In addition, the pump motor 120 may be a variable speed motor capable of varying the rotation speed. In this case, a brushless direct current (BLDC) motor is preferable, but not necessarily limited thereto.

The impeller 170 is a centrifugal fan or a cross flow fan, and pumps the water, which is introduced in the −X axis direction through the inflow port 111, in a direction orthogonal to the X axis. The impeller 170 may include a disc-shaped main plate 171 connected to a rotary shaft 142a and a plurality of water-flow forming ribs 172 that protrude from the main plate 171 and are radially arranged.

The pump motor 120 may transmit rotational force to the impeller 170 through the planetary gear train 140. In the pump motor 120, a motor body having a magnet and a rotor is disposed in the outer side of the pump housing 110, preferably, in the rear surface of the pump housing 110, and a rotary shaft 121 rotated by the rotor passes through the rear surface of the pump housing 110, and enters the space S.

The planetary gear train 140 converts the rotation speed of the pump motor 120 with a preset ratio and transmits to the impeller 170. In particular, the planetary gear train 140 may be an accelerator that increases the rotation speed of the pump motor 120 and transmits to the impeller 170. The accelerator may be used when it is necessary to rotate the impeller 170 at a higher speed than the pump motor 120 depending on the use environment. For example, when the washing machine is installed in a basement and an in-house drainage canal is installed on the ground, the lift of the pump 100 should be also increased because the drain pipe 25 should reach a height higher than the position where the washing machine is installed. Therefore, in this case, it is necessary to provide the planetary gear train 140 serving as an accelerator to accelerate the rotation speed of the impeller 170.

The planetary gear train 140 includes a carrier 141, a sun gear 142, a pinion gear 143, and a ring gear 144. The carrier 141 is connected (or shaft coupled) to the rotary shaft 121 of the pump motor 120, and is rotated together with the rotary shaft 121. The pinion gear 143 may be rotatably mounted in the carrier 141. The pinion gear 143 is meshed (or engaged) with the sun gear 142. A plurality of pinion gears 143 may be disposed around the sun gear 142.

The carrier 141 may include a first support plate 141a and a second support plate 141b disposed on both sides of the pinion gear 143. Opposite ends of the rotary shaft 143a of the pinion gear 143 are connected to the first support plate 141a and the second support plate 141b. The pinion gear 143 may be rotated with respect to the rotary shaft 143a. Alternatively, opposite ends of the rotary shaft 143a may be rotatably coupled to the first supporting plate 141a and the second supporting plate 141b, respectively, in a state in which the rotary shaft 143a is configured to rotate integrally with the pinion gear 143.

The sun gear 142 is surrounded by the pinion gears 143(1) and 143(2). Each pinion gear 143 is meshed with the sun gear 142. The ring gear 144 is meshed with (or engaged with) the pinion gear 143.

The ring gear 144 is formed in a ring shape, and may be an internal gear in which a gear tooth meshing with the pinion gear 143 is formed in the inner circumferential surface. When the carrier 141 is relatively rotated with respect to the ring gear 144, the pinion gear 143 circles (i.e., revolving around the sun gear 142) along the inner circumferential surface of the ring gear 144.

When the carrier 141 rotates while the rotation of the ring gear 144 is restrained, the sun gear 142 is rotated. More specifically, assuming that the rotation speed of the carrier 141 (or the rotation speed of the pump motor 120) at this time is RPMc, and the rotation speed of the sun gear 142 (or the rotation speed of the impeller 170) is RPMs, the speed ratio RPMs/RPMc is defined as follows.

$$\frac{RPMs}{RPMc} = 1 + \frac{Zr}{Zs}, \quad \text{[Equation 1]}$$

where Zr is the number of teeth of the ring gear, Zs is the number of teeth of the sun gear As can be seen from the above Equation, since the output side speed RPMs of the planetary gear train 140 can be made higher than the input side speed RPMc by appropriately combining the number of teeth Zr of the ring gear with the number of teeth Zs of the sun gear, it is effective for enhancing the lift.

The valve disc 130 is rotatably provided integrally with the ring gear 144 in the pump housing 110. Since the rotation of the ring gear 144 is not restrained, the ring gear 144 is rotated in the direction opposite to the sun gear 142 when the pump motor 120 is rotated. At this time, the valve disc 130 coupled with the ring gear 144 is also rotated in the same direction as the ring gear 144.

The valve disc 130 selectively opens and closes the first discharge port 112 and the second discharge port 114 according to the rotation position. FIG. 4 shows a state in which the valve disc 130 is in a first rotation position, and at this time, the first discharge port 112 is closed and the second discharge port 114 is opened (drain mode).

FIG. 6 shows a state in which the valve disc 130 is in a second rotation position, and at this time, the first discharge port 112 is opened and the second discharge port 114 is opened (circulation mode).

The valve disc 130 may be provided with a first stopper that restrains the valve disc 130 from rotating further when the valve disc 130 is rotated in the normal rotation direction (clockwise direction in FIG. 4) to reach the first rotation position. The first stopper may be variously implemented. For example, the first stopper may be configured of a structure such as a protrusion or rib protruding from the inner circumferential surface 111 of the pump housing 110 and interfering with the valve disc 130 when the valve disc 130 rotates in the normal rotation direction. The structure may be integrally formed with the pump housing 110, or may be implemented by a separate part and coupled to the pump housing 110.

The valve disc 130 may include a rotating body 131 connected to the ring gear 144, and a first plug 135 and a second plug 137 protruding from the outer periphery of the rotating body 131 and spaced from each other by a certain angle with respect to the rotation center O of the rotating body 131. The rotating body 131 may include a gear housing 132 defining a space in which the planetary gear train 140 is accommodated and a disk 133 extending radially outward from the gear housing 132.

The gear housing 132 may include a rear surface portion 132a through which the rotary shaft 121 of the pump motor 120 passes, a front surface portion 132b spaced forward from the rear surface portion 132a and positioned behind the impeller 170, and a cylindrical side surface portion 132c connecting the rear surface portion 132a and the front surface portion 132b. The ring gear 144 may be fixed to the inner surface of the side surface portion 132c.

The rotary shaft 121 of the pump motor 120 may be connected to the second support plate 141b of the carrier 141 through the rear surface portion 132a of the gear housing 132, and the rotary shaft 142a connected to the sun gear 142 may be connected to the impeller 170 through the front surface portion 132b of the gear housing 132.

The first plug 135 may close the first discharge port 112 when the rotating body 131 is in the first rotation position, and may open the first discharge port 112 when the rotating body 131 rotates in the reverse rotation direction (counterclockwise direction in the embodiment) from the first rotation position. The first stopper 117a may protrude from the inner circumferential surface of the pump housing 110. When the valve disc 130 is in the first rotation position, the first stopper 117a may interfere with the first plug 135 to restrain the valve disc 130 so that the valve disc 130 is no longer rotated in the normal rotation direction. That is, in a state in which the valve disc 130 reaches the first rotation position and the first discharge port 112 is closed by the first plug 135, the first plug 135 is interfered with the first stopper 117a in the normal rotation direction. Specifically, the first stopper 117a may be a protrusion interfering with the normal rotation direction tip 135a of the first plug 135.

The rotation of the ring gear 144 is also restrained when the first stopper 117a restrains the rotation of the valve disc 130 in the normal rotation direction. Thus, when the rotation of the pump motor 120 continues in this state, the impeller 170 rotates at the maximum speed according to the acceleration ratio defined by Equation 1. That is, when the pump motor 120 is rotated at a preset speed, the lift capacity for drain is maximized.

The first plug 135 may include a first plug body portion 135b extending along the circumferential direction, and a first sealing protrusion 135c protruding outward along the radial direction from the first plug body portion 135b. When the valve disc 130 is in the first rotation position, the first sealing protrusion 135c comes into close contact with the inner circumferential surface 111 of the pump housing 110, thereby preventing water from leaking to the first discharge port 112 through a gap between the tip of the inlet 112h (inlet circumference of the forward side based on the rotation direction of the impeller 170) of the first discharge port 112 and the first plug body portion 135b.

The inner circumferential surface 111 of the pump housing 110 may include a circling permitting area 111a and a first sealing area 111b. The circling permitting area 111a is formed in a section where the first sealing protrusion 135c circles due to the rotation of the valve disc 130 and, particularly, is formed in the outer side of the first sealing protrusion 135c in the radial direction. The first sealing protrusion 135c is radially spaced apart from the circling permitting area 111a in any position.

The first sealing area 111b is bent toward the rotating body 131 from the circling permitting area 111a, and positioned in the normal rotation direction than the first sealing protrusion 135c in the state in which the valve disk 130 reaches the first rotation position. In a state in which the valve disc 130 reaches the first rotation position, the first sealing area 111b is in close contact with the first sealing protrusion 135c. Therefore, airtightness is maintained between the first sealing area 111b and the first sealing protrusion 135c.

The first sealing area 111b extends inwardly in the radial direction from the circling permitting area 111a, and forms a step between the circling permitting area 111a and the first sealing area 111b. Therefore, even if torque is applied to the valve disc 130 in the normal rotation direction, since the first sealing protrusion 135c is caught in a stepped portion, the further rotation of the valve disc 130 in the normal rotation direction is restrained. The tip 135a of the first plug 135 interferes with the first stopper 117a in a state in which the valve disc 130 reaches the first rotation position. Furthermore, the first sealing protrusion 135c is also caught in the stepped portion (or the first sealing protrusion 135c is in close contact with the first sealing area 111b). Therefore, there is an effect that the braking load (i.e., the force of restraining the valve disc 130 so as not to rotate further in the normal rotation direction) applied to the valve disc 130 is dispersed to the tip 135a of the first plug 135 and the first sealing protrusion 135c.

The second plug 137 may close the second discharge port 114 when the rotating body 131 is in the second rotation position, and may open the second discharge port 114 when the rotating body 131 rotates in the normal rotation direction (clockwise direction in the embodiment) from the second rotation position. The second stopper 117b protrudes from the inner circumferential surface of the pump housing 110, and interferes with the second plug 137 when the valve disc 130 is in the second rotation position, so that the valve disc 130 may be restrained not to rotate in the reverse rotation direction any more. That is, in a state in which the valve disc 130 reaches the second rotation position and the second discharge port 114 is closed by the second plug 137, the second plug 137 is interfered with the second stopper 117b in the reverse rotation direction. Specifically, the second stopper 117b may be a protrusion interfering with the tip 137a of the second plug 137 in the reverse rotation direction.

The rotation of the ring gear 144 is also restrained in the state where the rotation of the valve disc 130 in the reverse rotation direction is restrained by the second stopper 117b. Therefore, if the rotation of the pump motor 120 continues in this state, the impeller 170 rotates at the maximum speed according to the acceleration ratio defined by Equation 1. That is, when the pump motor 120 rotates at a preset speed, water may be sprayed at the maximum water pressure through the nozzle 29.

The inner circumferential surface 111 of the pump housing 110 may further include a second sealing area 111b which is in close contact with a second sealing protrusion 137c of the second plug 137. The second sealing area 111c is bent from the circling permitting area 111a toward the rotating body 131, and is positioned in the normal rotation direction than the second sealing protrusion 137c in the state in which the valve disc 130 reaches the second rotation position. In a state in which the valve disc 130 reaches the second rotation position, the second sealing area 111b is in close contact with the second sealing protrusion 137c. Hence, airtightness is maintained between the first sealing area 111b and the second sealing protrusion 137c.

The second sealing area 111b extends inwardly in the radial direction from the circling permitting area 111a, and forms a step between the circling permitting area 111a and the second sealing area 111b. Therefore, even if torque is applied to the valve disc 130 in the reverse rotation direction, since the second sealing protrusion 137c is caught in a stepped portion, the further rotation of the valve disc 130 in the reverse rotation direction is restrained. The tip 137a of the second plug 137 interferes with the second stopper 117a in a state in which the valve disc 130 reaches the second rotation position. Furthermore, the second sealing protrusion 137c is also caught in the stepped portion (or the second sealing protrusion 137c is in close contact with the second sealing area 111b).

Therefore, there is an effect that the braking load (i.e., the force of restraining the valve disc 130 so as not to rotate further in the normal rotation direction) applied to the valve disc 130 is dispersed to the tip 137a of the second plug 137 and the second sealing protrusion 137c.

Figure 7:
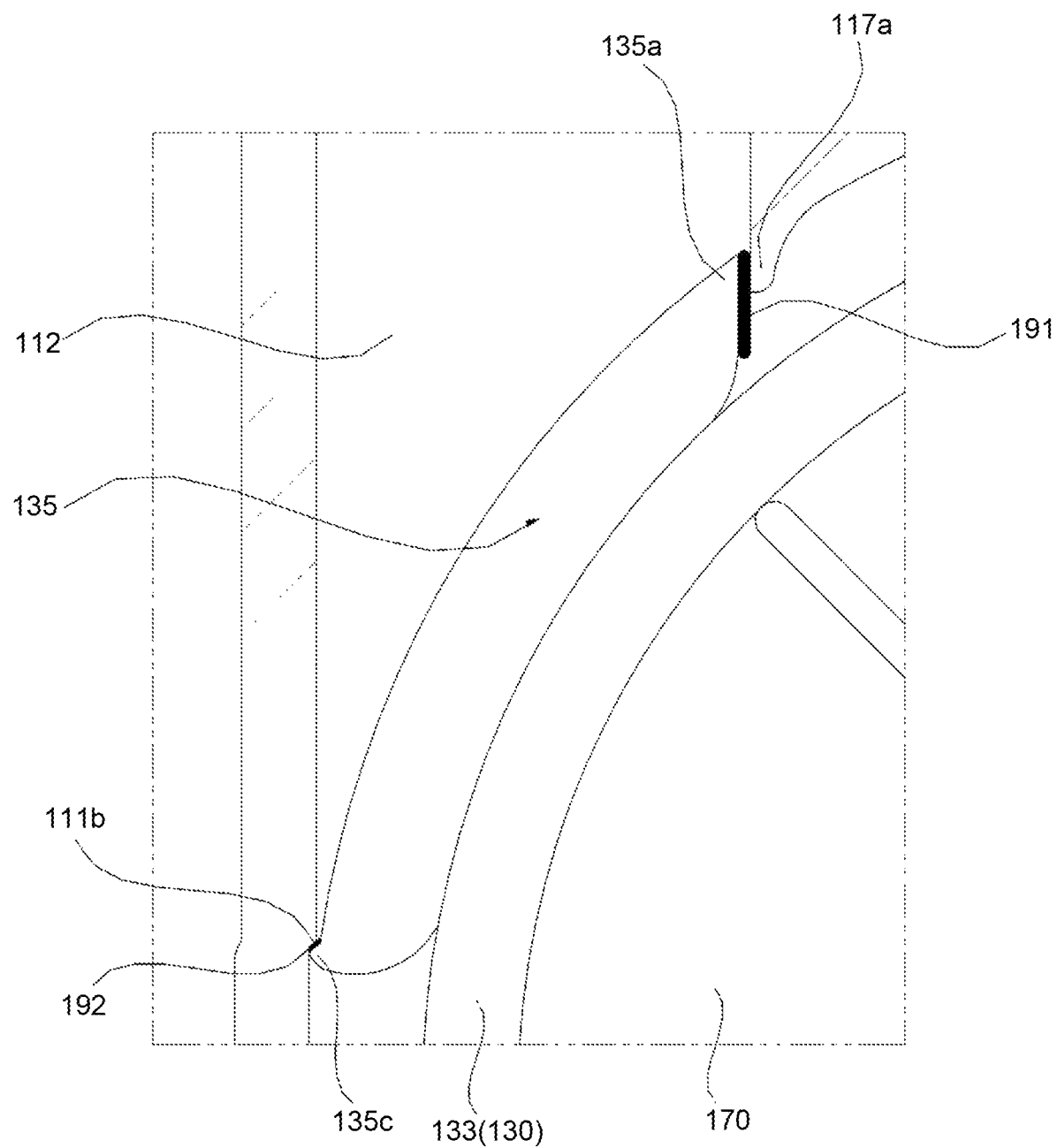
FIG. 7 is a view showing a valve disk according to another embodiment of the present disclosure.

FIG. 7 is a view showing a valve disk according to another embodiment of the present disclosure. Referring to FIG. 7, a first buffer member 191 may be interposed between the first plug 135 and the first stopper 117a. The first buffer member 191 is made of a material for absorbing impacts (e.g., felt or rubber), and may be fixed to the first plug 135 or the first stopper 117a. The first buffer member 191 may be disposed in the tip 135a of the first plug 135, when being fixed to the first plug 135. The impact when the tip 135a of the first plug 135 collides with the first stopper 117a may be absorbed by the first buffer member 191.

Although not shown, a third buffer member may be interposed between the second plug 137 and the second stopper 117b. Similarly to the first buffer member 191, the third buffer member may be disposed in the tip 137a of the second plug 137.

The second buffer member 192 may be interposed between the first sealing protrusion 135c and the first sealing area 111b. The second buffer member 192 may be fixed to the first sealing protrusion 135c or the first sealing area 111b.

The impact when the first sealing protrusion 135c collides with the first sealing area 111b may be absorbed by the second buffer member 192.

Although not shown, a fourth buffer member may be interposed between the second sealing protrusion 137c and the second sealing area 111b. Similarly to the second buffer member 192, the third buffer member may be fixed to the second sealing protrusion 137c or the second sealing area 111c.

Figure 8:
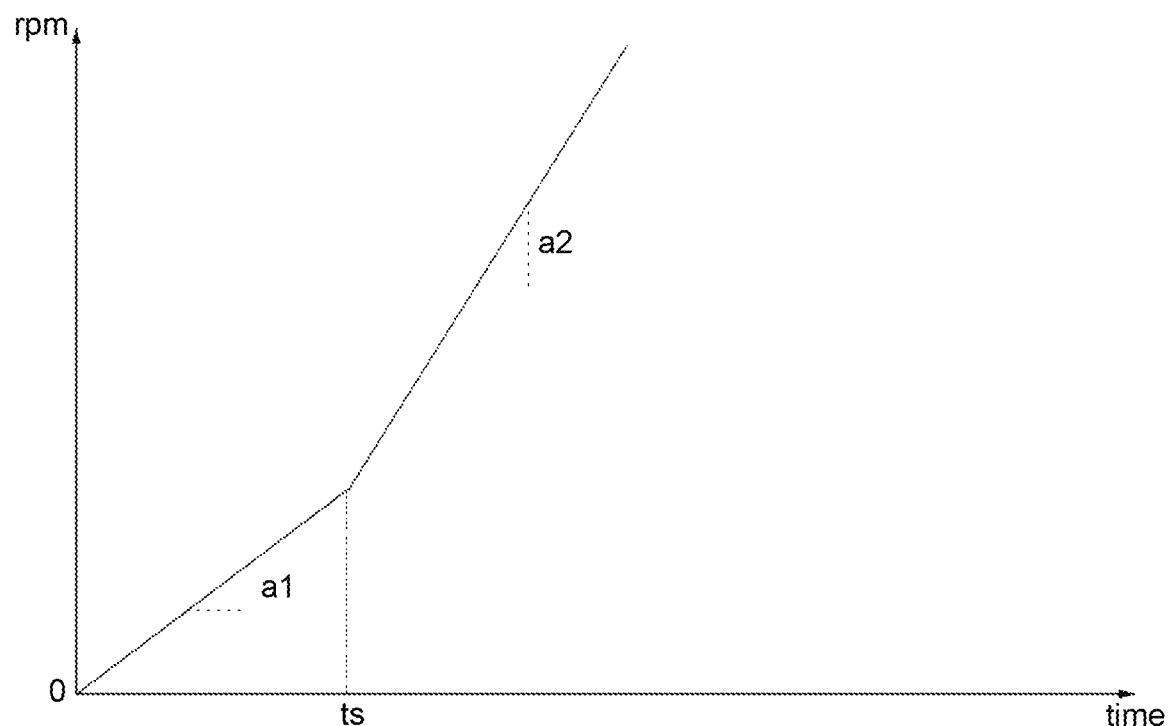
FIG. 8 is a graph showing a change in a speed of a pump motor when a flow path is switched.

FIG. 8 is a graph showing a change in a speed of a pump motor when a flow path is switched.

Referring to FIG. 8, when the pump motor 120 is started to close any one of the first discharge port 112 and the second discharge port 114 or when the pump motor 120 is rotated in the opposite direction to switch the discharge flow path, the pump motor 120 is accelerated with a first acceleration slope a1 in the initial starting. Then, when a preset time Ts comes, the pump motor 120 may be rotated with a second acceleration slope a2 which is larger than the first acceleration slope a1.

Although not shown, a controller for controlling the rotation of the pump motor 120 as described above may be provided. The controller may include a microprocessor electrically connected to a driving driver of the pump motor 120.

Meanwhile, the change from the first acceleration slope a1 to the second acceleration slope a2 may be implemented based on the load applied to the pump motor 120. Since the load applied to the pump motor 120 suddenly increases when the plug 135, 137 interferes with the stopper 115a, 117a, the current value flowing through the pump motor 120 also abruptly fluctuates. Therefore, the controller may switch from the first acceleration slope a1 to the second acceleration slope a2 based on the current value flowing through the pump motor 120.

The above description exemplifies a top load type washing machine in which the washing tub is rotated around a vertical axis, but the scope of the present disclosure is not limited thereto. That is, the above-described pump can also be applied to a front load type washing machine in which a washing tub having an opened front surface is rotated around a substantially horizontal axis.

Furthermore, the pump is not limited to a washing machine, and may be applied to various types of equipment such as a dishwasher, a bathtub, a water tank, a water heater, a boiler, and the like.

As described above, since the pump of the present disclosure and the washing machine including the same actively perform opening and closing operations of the first discharge port and the second discharge port by a valve disk interlocked with the pump motor, the operation of the valve disk can be accurately performed irrespective of the water flow state (e.g., the flow resistance of the water flow, water pressure), and the like in the pump.

Second, opening and closing of the first discharge port and the second discharge port may be accurately controlled even if foreign matter such as lint is floating in the water flow.

Third, planetary gear train is applied to increase the speed of the impeller so that the lift capability is improved, and the operation of the valve disk can be controlled by using the ring gear that is part of the planetary gear train. Thus, the control of the valve disc is simple, and no additional components are required for such control, which is efficient.

Fourth, unnecessary noise can be prevented from being generated when the valve disc switches the flow path.

Fifth, the durability of the valve disc can be improved by reducing the impact applied to the valve disc in the process of switching the flow path.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, the scope of the present disclosure is not construed as being limited to the described embodiments but is defined by the appended claims as well as equivalents thereto.

What is claimed is:

1. A pump comprising:
   a pump housing, the pump housing including an inflow port, a first discharge port, and a second discharge port;
   a pump motor configured to generate a rotational force;
   an impeller disposed in the pump housing and configured to pump water introduced through the inflow port;
   a planetary gear train comprising:
     a carrier connected to a rotary shaft of the pump motor,
     a sun gear connected to the impeller,
     a pinion gear rotatably installed in the carrier and engaged with the sun gear, and
     a ring gear engaged with the pinion gear; and
   a rotatable valve disc coupled with the ring gear in the pump housing, wherein the valve disc is configured to close the first discharge port and open the second discharge port in a first rotation position, and open the first discharge port and close the second discharge port in a second rotation position.

2. The pump of claim 1, further comprising:
   a first stopper configured for restraining rotation of the valve disk in a normal rotation direction when the valve disk is rotated in the normal rotation direction to reach the first rotation position; and
   a second stopper configured for restraining rotation of the valve disc in a reverse rotation direction when the valve disc is rotated in the reverse rotation direction from the first rotation position to reach the second rotation position.

3. The pump of claim 2, wherein the valve disc comprises:
   a rotatable body connected to the ring gear;
   a first plug protruding from an outer circumference of the rotatable body, wherein the first plug is configured to close the first discharge port when the rotatable body is in the first rotation position, and open the first discharge port when the rotatable body rotates in the reverse rotation direction from the first rotation position; and
   a second plug protruding from the outer circumference of the rotatable body, wherein the second plug is configured to close the second discharge port when the rotatable body is in the second rotation position, and open the second discharge port when the rotatable body rotates in the normal rotation direction from the second rotation position.

4. The pump of claim 3, wherein the first stopper protrudes from an inner circumferential surface of the pump housing, wherein the inner circumferential surface of the pump housing defines a space in which the impeller is accommodated, and the first stopper is configured to restrain rotation of the valve disc in the normal rotation direction by interference with the first plug.

5. The pump of claim 4, wherein the first stopper is configured to interfere with a tip of the first plug when the valve disc is rotated in the normal rotation direction.

6. The pump of claim 5, wherein the first plug comprises:
a first plug body portion extending in the reverse rotation direction from the tip of the first plug when the valve disc is rotated in the normal rotation direction and blocking the first discharge port; and
a first sealing protrusion protruding outward along a radial direction from the first plug body portion,
wherein the inner circumferential surface of the pump housing comprises:
a circling permitting area formed in an outer side of the sealing protrusion in the radial direction in a section where the sealing protrusion circles due to the rotation of the valve disc; and
a first sealing area that is bent toward the rotatable body from the circling permitting area, and is in close contact with the first sealing protrusion when the valve disc has been rotated in the normal rotation direction to the first rotation position.

7. The pump of claim 6, wherein the second stopper is protruded from an inner circumferential surface of the pump housing, and restrains rotation of the valve disc in the reverse rotation direction by interference with the second plug.

8. The pump of claim 7, wherein the second stopper interferes with a tip of second plug when the valve disc is rotated in the reverse rotation direction.

9. The pump of claim 8, wherein the second plug comprises:
a second plug body portion extending in the normal rotation direction from the tip of the second plug body portion when the valve disc is rotating in the reverse rotation direction and blocking the second discharge port; and
a second sealing protrusion protruding outward along a radial direction from the second plug body portion,
wherein the inner circumferential surface of the pump housing comprises:
a circling permitting area formed in an outer side of the second sealing protrusion in the radial direction in a section where the second sealing protrusion circles due to the rotation of the valve disc; and
a second sealing area that is bent toward the rotating body from the circling permitting area, the second sealing area being in close contact with the second sealing protrusion when the valve disc has been rotated in the reverse rotation direction to the second rotation position.

10. The pump of claim 9, further comprising a buffer member interposed between the first sealing protrusion and the first sealing area.

11. The pump of claim 10, further comprising a buffer member interposed between the second sealing protrusion and the second sealing area.

12. The pump of claim 3, further comprising a buffer member interposed between the first plug and the first stopper.

13. The pump of claim 12, further comprising a buffer member interposed between the second plug and the second stopper.

14. The pump of claim 1, wherein the pump motor is started and rotated for a first period of time at a first rate of change of speed of rotation versus time as represented by a first acceleration slope over the first period of time and is switched to a second rate of change of speed of rotation versus time as represented by a second acceleration slope greater than the first acceleration slope following the first period of time.

15. The pump of claim 14, wherein the switching from the first acceleration slope to the second acceleration slope is performed based on an amount of current flowing in the pump motor.

16. A washing machine comprising:
a water storage tank containing water;
a washing tub rotatably installed in the water storage tank; and
a pump for selectively pumping water discharged from the water storage tank to a drain pipe or a circulation pipe,
wherein the pump comprises:
a pump housing, the pump housing including an inflow port through which water discharged from the water storage tank is introduced, a first discharge port through which water is discharged to the drain pipe, and a second discharge port through which water is discharged to the circulation pipe;
an impeller rotatably mounted in the pump housing;
a pump motor configured for providing a rotational force;
a planetary gear train comprising:
a carrier connected to a rotary shaft of the pump motor,
a sun gear connected to the impeller,
a pinion gear rotatably installed in the carrier and engaged with the sun gear, and
a ring gear engaged with the pinion gear; and
a rotatable valve disc coupled with the ring gear in the pump housing, wherein the valve disc is configured to close the first discharge port and open the second discharge port in a first rotation position, and open the first discharge port and close the second discharge port in a second rotation position.

17. The washing machine of claim 16, further comprising:
a first stopper configured for restraining rotation of the valve disk in a normal rotation direction when the valve disk is rotated in the normal rotation direction to reach the first rotation position; and
a second stopper configured for restraining rotation of the valve disc in a reverse rotation direction when the valve disc is rotated in the reverse rotation direction from the first rotation position to reach the second rotation position.

18. The washing machine of claim 17, wherein the valve disc comprises:
a rotatable body connected to the ring gear;
a first plug protruding from an outer circumference of the rotatable body, the first plug being configured to close the first discharge port when the rotatable body is in the first rotation position, and open the first discharge port when the rotatable body rotates in the reverse rotation direction from the first rotation position; and
a second plug protruding from the outer circumference of the rotatable body, the second plug being configured to close the second discharge port when the rotatable body is in the second rotation position, and open the second discharge port when the rotatable body rotates in the normal rotation direction from the second rotation position.

* * * * *